(12) United States Patent
Nakayama

(10) Patent No.: US 7,539,355 B2
(45) Date of Patent: May 26, 2009

(54) DATA TRANSFORM METHOD AND APPARATUS

(75) Inventor: Tadayoshi Nakayama, Adachi-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 11/206,054

(22) Filed: Aug. 18, 2005

(65) Prior Publication Data
US 2006/0045369 A1  Mar. 2, 2006

(30) Foreign Application Priority Data
Aug. 27, 2004  (JP) .............................. 2004-249021

(51) Int. Cl.
*G06K 9/36*  (2006.01)
(52) U.S. Cl. ..................... 382/281; 382/244; 382/248; 382/277
(58) Field of Classification Search ................. 382/235, 382/244, 277, 281, 248
See application file for complete search history.

(56) References Cited

U.S. PATENT DOCUMENTS

| 5,247,354 | A | * | 9/1993 | Nakajima .................... 348/621 |
| 5,526,446 | A | * | 6/1996 | Adelson et al. ............. 382/275 |
| 5,687,218 | A | | 11/1997 | Nakayama .................... 379/61 |
| 6,272,634 | B1 | * | 8/2001 | Tewfik et al. ............... 713/176 |
| 6,728,409 | B2 | * | 4/2004 | Inoue et al. .................. 382/232 |
| 6,751,354 | B2 | * | 6/2004 | Foote et al. .................. 382/224 |
| 6,774,917 | B1 | * | 8/2004 | Foote et al. .................. 715/700 |
| 6,901,514 | B1 | * | 5/2005 | Iu et al. ........................ 713/176 |
| 6,937,767 | B1 | * | 8/2005 | Burak et al. ................. 382/232 |
| 7,034,684 | B2 | * | 4/2006 | Boman et al. ............ 340/568.1 |
| 7,180,588 | B2 | * | 2/2007 | Geshwind et al. ........... 356/310 |

2003/0120691 A1  6/2003  Nakayama .................. 708/400

OTHER PUBLICATIONS

Tadayoshi Nakayama, Hidefumi Ohsawa, Naoto Kawamura, "New Lossless Transform Method And Application For Lossless 2D-DCT", Visual Information Technology Development Laboratory, Canon Inc. Japan Institute of Image Electrics BLL Engineers of Japan, pp. 787-793, Sep. 2002.

Tadayoshi Nakayama, Modoka Hasegawa and Shigeo Kato, "Method For Improving PSNR Of Lossy Hadamard Transform And Its Application For Lossless Image Coding" Japan Institute of Image Electrics BLL Engineers of Japan, vol. 32, No. 5, pp. 700-708, Sep. 2003.

(Continued)

*Primary Examiner*—Yosef Kassa
(74) *Attorney, Agent, or Firm*—Fitzpatrick, Cella, Harper & Scinto

(57) ABSTRACT

A data transform method comprises a linear transform step of acquiring 16 linear Hadamard transform coefficients by multiplying the 16 pieces of data by an Hadamard transform matrix, an offset step of classifying the 16 linear Hadamard transform coefficients into four groups, each group containing an odd number of coefficients, and adding a predetermined offset value to linear Hadamard transform coefficients in every group, and an integral step of acquiring the lossless Hadamard transform coefficients by truncating decimal fractions down from a decimal point from the linear Hadamard transform coefficients added said predetermined offset value. With this configuration, a 16-point lossless Hadamard transform is implemented using only one rounding process.

14 Claims, 11 Drawing Sheets

OTHER PUBLICATIONS

Shinji Fukuma, Koichi Oyama, Masahiro Iwahashi, Noriyoshi Kambayashi, "Lossless 8-Point Fast Discrete Cosine Transform Using Lossless Hadamard Transform", The Institute Of Electronics, Information And Communication Engineers Of Japan Technical Report, pp. 37-44, Oct. 1999.

Kunitoshi Komatsu and Kaoru Sezaki, "Two Dimensional Lossless Transform And Its Application To Image Coding", The Institute Of Electronics, Information And Communication Engineers Of Japan Technical Report, pp. 19-26, Oct. 2000.

* cited by examiner

FIG. 1

$$H_{16} = \frac{1}{4} \begin{bmatrix} 1 & 1 & 1 & 1 & 1 & 1 & 1 & 1 & 1 & 1 & 1 & 1 & 1 & 1 & 1 & 1 \\ 1 & -1 & 1 & -1 & 1 & -1 & 1 & -1 & 1 & -1 & 1 & -1 & 1 & -1 & 1 & -1 \\ 1 & 1 & -1 & -1 & 1 & 1 & -1 & -1 & 1 & 1 & -1 & -1 & 1 & 1 & -1 & -1 \\ 1 & -1 & -1 & 1 & 1 & -1 & -1 & 1 & 1 & -1 & -1 & 1 & 1 & -1 & -1 & 1 \\ 1 & 1 & 1 & 1 & -1 & -1 & -1 & -1 & 1 & 1 & 1 & 1 & -1 & -1 & -1 & -1 \\ 1 & -1 & 1 & -1 & -1 & 1 & -1 & 1 & 1 & -1 & 1 & -1 & -1 & 1 & -1 & 1 \\ 1 & 1 & -1 & -1 & -1 & -1 & 1 & 1 & 1 & 1 & -1 & -1 & -1 & -1 & 1 & 1 \\ 1 & -1 & -1 & 1 & -1 & 1 & 1 & -1 & 1 & -1 & -1 & 1 & -1 & 1 & 1 & -1 \\ 1 & 1 & 1 & 1 & 1 & 1 & 1 & 1 & -1 & -1 & -1 & -1 & -1 & -1 & -1 & -1 \\ 1 & -1 & 1 & -1 & 1 & -1 & 1 & -1 & -1 & 1 & -1 & 1 & -1 & 1 & -1 & 1 \\ 1 & 1 & -1 & -1 & 1 & 1 & -1 & -1 & -1 & -1 & 1 & 1 & -1 & -1 & 1 & 1 \\ 1 & -1 & -1 & 1 & 1 & -1 & -1 & 1 & -1 & 1 & 1 & -1 & -1 & 1 & 1 & -1 \\ 1 & 1 & 1 & 1 & -1 & -1 & -1 & -1 & -1 & -1 & -1 & -1 & 1 & 1 & 1 & 1 \\ 1 & -1 & 1 & -1 & -1 & 1 & -1 & 1 & -1 & 1 & -1 & 1 & 1 & -1 & 1 & -1 \\ 1 & 1 & -1 & -1 & -1 & -1 & 1 & 1 & -1 & -1 & 1 & 1 & 1 & 1 & -1 & -1 \\ 1 & -1 & -1 & 1 & -1 & 1 & 1 & -1 & -1 & 1 & 1 & -1 & 1 & -1 & -1 & 1 \end{bmatrix}$$

FIG. 3

$$\begin{bmatrix} 0 & 1 & 1 & 1 \\ 1 & 0 & 0 & 0 \\ 1 & 0 & 0 & 0 \\ 1 & 0 & 0 & 0 \end{bmatrix}$$ EXAMPLE OF ODD-ODD PATTERN $$\begin{bmatrix} 0 & 1 & 1 & 1 \\ 0 & 1 & 0 & 0 \\ 0 & 0 & 1 & 0 \\ 0 & 0 & 0 & 1 \end{bmatrix}$$ EXAMPLE OF ODD-EVEN PATTERN $$\begin{bmatrix} 0 & 0 & 0 & 0 \\ 1 & 1 & 0 & 0 \\ 1 & 0 & 1 & 0 \\ 1 & 0 & 0 & 1 \end{bmatrix}$$ EXAMPLE OF EVEN-ODD PATTERN $$\begin{bmatrix} 1 & 1 & 1 & 1 \\ 1 & 1 & 0 & 0 \\ 1 & 0 & 1 & 0 \\ 1 & 0 & 0 & 1 \end{bmatrix}$$ EXAMPLE OF EVEN-EVEN PATTERN

FIG. 4

| FIRST DECIMAL PLACE | 6 | | | | 6 | | | | 10 | | | | 10 | |
|---|---|---|---|---|---|---|---|---|---|---|---|---|---|---|
| SECOND DECIMAL PLACE | 6 | | | | 10 | | | | 6 | | | | 10 | |
| OFFSET VALUE 0.75 | 1 | 3 | 3 | 3 | 3 | 5 | 5 | 3 | 3 | 5 | 5 | 5 | 5 | 7 |
| OFFSET VALUE 0.5 | 5 | 3 | 3 | 3 | 3 | 1 | 5 | 7 | 7 | 5 | 5 | 5 | 5 | 3 |
| OFFSET VALUE 0.25 | 5 | 3 | 3 | 7 | 7 | 5 | 5 | 3 | 3 | 1 | 5 | 1 | 5 | 3 |
| OFFSET VALUE 0 | 5 | 7 | 7 | 3 | 3 | 5 | 5 | 3 | 3 | 5 | 5 | 5 | 1 | 3 |

FIG. 5A (1, 5, 5, 5)

$$\frac{1}{4}\begin{bmatrix} 1 & 2 & 2 & 2 \\ 1 & 2 & 0 & 0 \\ 1 & 0 & 2 & 0 \\ 0 & 1 & 1 & 3 \end{bmatrix} = \frac{1}{2}\begin{bmatrix} 0 & 1 & 1 & 1 \\ 0 & 1 & 0 & 0 \\ 0 & 0 & 1 & 0 \\ 0 & 0 & 0 & 1 \end{bmatrix} + \frac{1}{4}\begin{bmatrix} 1 & 0 & 0 & 0 \\ 1 & 0 & 0 & 0 \\ 1 & 0 & 0 & 0 \\ 0 & 1 & 1 & 1 \end{bmatrix}$$

(3, 3, 3, 7)

$$\frac{1}{4}\begin{bmatrix} 0 & 3 & 3 & 3 \\ 1 & 2 & 0 & 0 \\ 1 & 0 & 2 & 0 \\ 1 & 0 & 0 & 2 \end{bmatrix} = \frac{1}{2}\begin{bmatrix} 0 & 1 & 1 & 1 \\ 0 & 1 & 0 & 0 \\ 0 & 0 & 1 & 0 \\ 0 & 0 & 0 & 1 \end{bmatrix} + \frac{1}{4}\begin{bmatrix} 0 & 1 & 1 & 1 \\ 1 & 0 & 0 & 0 \\ 1 & 0 & 0 & 0 \\ 1 & 0 & 0 & 0 \end{bmatrix}$$

(3, 3, 7, 3)

$$\frac{1}{4}\begin{bmatrix} 1 & 2 & 2 & 2 \\ 0 & 3 & 1 & 1 \\ 0 & 1 & 3 & 1 \\ 0 & 1 & 1 & 3 \end{bmatrix} = \frac{1}{2}\begin{bmatrix} 0 & 1 & 1 & 1 \\ 0 & 1 & 0 & 0 \\ 0 & 0 & 1 & 0 \\ 0 & 0 & 0 & 1 \end{bmatrix} + \frac{1}{4}\begin{bmatrix} 1 & 0 & 0 & 0 \\ 0 & 1 & 1 & 1 \\ 0 & 1 & 1 & 1 \\ 0 & 1 & 1 & 1 \end{bmatrix}$$

(5, 1, 5, 5)

$$\frac{1}{4}\begin{bmatrix} 0 & 3 & 3 & 2 \\ 0 & 3 & 1 & 1 \\ 0 & 1 & 3 & 1 \\ 1 & 0 & 1 & 2 \end{bmatrix} = \frac{1}{2}\begin{bmatrix} 0 & 1 & 1 & 1 \\ 0 & 1 & 0 & 0 \\ 0 & 0 & 1 & 0 \\ 0 & 0 & 0 & 1 \end{bmatrix} + \frac{1}{4}\begin{bmatrix} 0 & 1 & 1 & 1 \\ 0 & 1 & 1 & 1 \\ 0 & 1 & 1 & 1 \\ 1 & 0 & 0 & 0 \end{bmatrix}$$

FIG. 5B (3, 7, 3, 3)

$$\frac{1}{4}\begin{bmatrix} 2 & 2 & 2 & 2 \\ 2 & 3 & 1 & 0 \\ 2 & 0 & 3 & 1 \\ 2 & 1 & 0 & 3 \end{bmatrix} = \frac{1}{2}\begin{bmatrix} 1 & 1 & 1 & 1 \\ 1 & 1 & 0 & 0 \\ 1 & 0 & 1 & 0 \\ 1 & 0 & 0 & 1 \end{bmatrix} + \frac{1}{4}\begin{bmatrix} 0 & 0 & 0 & 0 \\ 0 & 1 & 1 & 0 \\ 0 & 0 & 1 & 1 \\ 0 & 1 & 0 & 1 \end{bmatrix}$$

(5, 5, 1, 5)

$$\frac{1}{4}\begin{bmatrix} 3 & 2 & 2 & 3 \\ 2 & 2 & 0 & 0 \\ 3 & 0 & 3 & 0 \\ 2 & 0 & 1 & 3 \end{bmatrix} = \frac{1}{2}\begin{bmatrix} 1 & 1 & 1 & 1 \\ 1 & 1 & 0 & 0 \\ 1 & 0 & 1 & 0 \\ 1 & 0 & 0 & 1 \end{bmatrix} + \frac{1}{4}\begin{bmatrix} 1 & 0 & 0 & 1 \\ 0 & 0 & 0 & 0 \\ 1 & 0 & 1 & 0 \\ 0 & 0 & 1 & 1 \end{bmatrix}$$

(5, 5, 5, 1)

$$\frac{1}{4}\begin{bmatrix} 2 & 3 & 3 & 2 \\ 3 & 3 & 1 & 1 \\ 2 & 1 & 2 & 1 \\ 3 & 1 & 0 & 2 \end{bmatrix} = \frac{1}{2}\begin{bmatrix} 1 & 1 & 1 & 1 \\ 1 & 1 & 0 & 0 \\ 1 & 0 & 1 & 0 \\ 1 & 0 & 0 & 1 \end{bmatrix} + \frac{1}{4}\begin{bmatrix} 0 & 1 & 1 & 0 \\ 1 & 1 & 1 & 1 \\ 0 & 1 & 0 & 1 \\ 1 & 1 & 0 & 0 \end{bmatrix}$$

(7, 3, 3, 3)

$$\frac{1}{4}\begin{bmatrix} 3 & 3 & 3 & 3 \\ 3 & 2 & 0 & 1 \\ 3 & 1 & 2 & 0 \\ 3 & 0 & 1 & 2 \end{bmatrix} = \frac{1}{2}\begin{bmatrix} 1 & 1 & 1 & 1 \\ 1 & 1 & 0 & 0 \\ 1 & 0 & 1 & 0 \\ 1 & 0 & 0 & 1 \end{bmatrix} + \frac{1}{4}\begin{bmatrix} 1 & 1 & 1 & 1 \\ 1 & 0 & 0 & 1 \\ 1 & 1 & 0 & 0 \\ 1 & 0 & 1 & 0 \end{bmatrix}$$

FIG. 6

$$\frac{1}{4}\begin{bmatrix} 2 & 1 & 1 & 1 \\ 3 & 0 & 2 & 2 \\ 3 & 2 & 2 & 0 \\ 3 & 2 & 0 & 2 \end{bmatrix}$$

$$\frac{1}{4}\begin{bmatrix} 1 & 0 & 0 & 0 \\ 2 & 1 & 1 & 3 \\ 2 & 1 & 3 & 1 \\ 2 & 3 & 1 & 1 \end{bmatrix}$$

$$\frac{1}{4}\begin{bmatrix} 2 & 3 & 3 & 3 \\ 1 & 2 & 0 & 2 \\ 1 & 0 & 2 & 2 \\ 1 & 2 & 2 & 0 \end{bmatrix}$$

$$\frac{1}{4}\begin{bmatrix} 1 & 2 & 2 & 2 \\ 0 & 1 & 3 & 1 \\ 0 & 3 & 1 & 1 \\ 0 & 1 & 1 & 3 \end{bmatrix}$$

FIG. 7

| SAMPLE IMAGE | DOCUMENT (2) | PRESENT INVENTION |
|---|---|---|
| AIRPLANE | 4.704 | 4.679 |
| BABOON | 6.153 | 6.153 |
| COUPLE | 5.290 | 5.288 |
| LENNA | 4.629 | 4.624 |
| PEPPERS | 5.008 | 5.005 |
| AVERAGE | 5.157 | 5.153 |

(UNIT: bit / pel)

DATA TRANSFORM METHOD AND APPARATUS

FIELD OF THE INVENTION

This invention relates to a data transform method and an information processing apparatus that performs the method, and more particularly to a data transform method for performing an integer Hadamard transform capable of reversible transform and an information processing apparatus that performs the method.

BACKGROUND OF THE INVENTION

The image, especially multivalued image, contains a very large amount of information, and has a problem that the volume of data becomes enormous when the image is accumulated and transmitted. Therefore, in the accumulation and transmission of the image, a high efficiency coding is employed to reduce the volume of data by removing the redundancy of image, or changing the contents of the image to such an extent that the degradation of image quality is visually unrecognizable.

For example, in a JPEG method recommended by ISO and ITU-T as the international standard coding method for still image, the image data is converted into DCT coefficients by making the discrete cosine transform (DCT) for every block (8 pixels×8 pixels), each coefficient being quantized, and compressed by making the entropy coding. As the compression techniques using this DCT, H261 and MPEG1/2/4 are provided, besides JPEG.

The Hadamard transform is well known as a partial processing of this DCT conversion, or a processing of transforming the image data. The Hadamard transform is the simplest orthogonal transform implemented only by addition and subtraction in which the elements of a transform matrix consist of 1 or −1. In the following, the Hadamard transform will be simply described below.

The transform matrix $H_2$ of 2-point Hadamard transform is defined as follows.

[Formula 1]
$$H_2 = \frac{1}{\sqrt{2}} \begin{bmatrix} 1 & 1 \\ 1 & -1 \end{bmatrix} \quad (1)$$

A general $N(=2^n)$-point Hadamard transform matrix $H_N$ is defined recursively by the Kronecker product between an N/2-point Hadamard transform matrix $H_{N/2}$ and the 2-point Hadamard transform matrix $H_2$ as follows.

[Formula 2]
$$H_N = H_{N/2} \otimes H_2 \quad (2)$$
$$= \frac{1}{\sqrt{2}} \begin{bmatrix} H_{N/2} & H_{N/2} \\ H_{N/2} & -H_{N/2} \end{bmatrix}$$

From the above definition, a 4-point Hadamard transform matrix is obtained as

[Formula 3]
$$H_4 = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (3)$$

This transform matrix is called a natural type, in which the basis vectors are not arranged in the sequency order. The sequqency is similar to frequency. If the basis vector in the second row is moved to the fourth row by repeating the substitution of basis vectors, the transform matrix $WH_4$ is generated in which the basis vectors are arranged in the sequency order.

[Formula 4]
$$WH_4 = \frac{1}{2} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (4)$$

The above transform matrix is called a Walsh type or Walsh Hadamard transform matrix. The Hadamard transform is known as a reversible orthogonal transform, in which both the natural type and the Walsh type are capable of reversible transform, and the transform matrix is symmetric.

Moreover, if the Kronecker product is applied twice to the 4-point Hadamard transform matrix, a 16-point Hadamard transform matrix $H_{16}$ is obtained, as shown below. FIG. 1 shows the details of the transform matrix $H_{16}$.

[Formula 5]
$$H_{16} = H_4 \otimes H_2 \otimes H_2 \quad (5)$$
$$= \frac{1}{2} \begin{bmatrix} H_4 & H_4 & H_4 & H_4 \\ H_4 & -H_4 & H_4 & -H_4 \\ H_4 & H_4 & -H_4 & -H_4 \\ H_4 & -H_4 & -H_4 & H_4 \end{bmatrix}$$

It is generally said that the Hadamard transform is the reversible transform, but this means that the Hadamard transform is mathematically reversible. That is, it is premised that there is no operation error in the transform and the reverse transform. On the other hand, a transform that keeps the transform coefficients reversible by rounding to the whole number will be called a lossless transform, for distinction from the mathematically reversible transform hereafter in this specification When the data below the decimal point of the Hadamard transform coefficients is rounded to the whole number, the data after reverse transform may not be restored to the original data by simply truncate or rounding off. This is because the bit information below the decimal point is lost.

In Tadayoshi Nakayama, Hideshi Osawa, Naoto Kawamura, "New lossless transform and application to lossless two-dimensional DCT", Gadenshi, Vol. 31, No. 5, pp. 787-793, September 2002 (document 1), the lossless transform is implemented by performing a characteristic rounding process for the 4-point Hadamard transform. However, no rounding process for acquiring the reversible transform coefficients in the 16-point Hadamard transform was proposed.

In the document 1, there was described a method for extending the 4-point lossless Hadamard transform to the 16-point lossless Hadamard transform or the two-dimensional 4×4-point lossless Hadamard transform, in which the existent 4-point lossless Hadamard transforms are cascade connected, and processed at two stages, but the 16-point lossless Hadamard transform is not directly operated. The 16-point lossless Hadamard transform coefficients obtained by the cascade connection process or the two-dimensional 4×4-point lossless Hadamard transform coefficients has the rounding errors of two rounding processes convoluted. Since the rounding process for the lossless transform is a non-linear operation, the convoluted rounding error has non-linearity, and is less favorable for the transform coefficients. That is, if the rounding errors of two rounding processes are convoluted, a lot of non-linear rounding errors are convoluted, resulting in a problem.

Also, since it is required that the rounding process is performed twice for each transform coefficient, there is a problem that the operation amount increases.

SUMMARY OF THE INVENTION

The present invention has been achieved to solve the above-mentioned problems individually or collectively, and it is an object of the invention to provide a data transform method for acquiring the 16-point lossless Hadamard transform coefficients or the two-dimensional 4×4 lossless Hadamard transform coefficients only by one rounding process, and an information processing apparatus for performing the method.

Further, it is another object of the invention to implement a reversible coding process by applying the data transform method to the coding process.

The invention has the following steps as one method for achieving the above objects.

That is, a data transform method for acquiring the lossless Hadamard transform coefficients for 16 pieces of data, comprising a linear transform step of acquiring 16 linear Hadamard transform coefficients by multiplying the 16 pieces of data by an Hadamard transform matrix, an offset step of classifying the 16 linear Hadamard transform coefficients into four kinds of groups, each group containing an odd number of coefficients, and adding a predetermined offset value to linear Hadamard transform coefficients in every group, and an integral step of acquiring the lossless Hadamard transform coefficients by truncating decimal fractions down from a decimal point from the linear Hadamard transform coefficients added the predetermined offset value.

Also, the offset step may comprise making no addition to a first group of transform coefficients, adding 0.25 to a second group of transform coefficients, adding 0.5 to a third group of transform coefficients, and adding 0.75 to a four group of transform coefficients.

Further, the data transform method may further comprise a coding step of coding the lossless Hadamard transform coefficients, in which the coding step comprises making the entropy coding.

Also, the data transform method may further comprise a lossless DCT conversion step of making the lossless DCT conversion using the lossless Hadamard transform coefficients, and an entropy coding step of making the entropy coding for the lossless DCT coefficients obtained.

With the invention, the 16-point lossless Hadamard transform is implemented by the linear Hadamard transform and one rounding process for each transform coefficient, suppressing the rounding error.

Also, the coding amount is suppressed by directly making the entropy coding for the obtained lossless Hadamard transform coefficients.

Also, the lossless DCT transform with less rounding error is implemented by applying the 16-point lossless Hadamard transform of the invention to the DCT operation, and the reversible transform of image data is implemented by further applying it to the JPEG coding.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing a 16-point Hadamard transform matrix;

FIG. 3 is a diagram showing the specific examples of a bit plane structure of an offset matrix in this embodiment;

FIG. 4 is a diagram showing the itemization of 16 offset values for every combination of bit planes;

FIG. 5A is a diagram showing the specific examples of the offset matrix classified into eight kinds;

FIG. 5B is a diagram showing the specific examples of the offset matrix classified into eight kinds;

FIG. 6 is a diagram showing four examples of 286720 kinds of valid offset matrixes;

FIG. 7 is a diagram showing the entropy examples of lossless Hadamard transform coefficients;

DETAILED DESCRIPTION OF THE PREFERRED EMBODIMENTS

The preferred embodiments of the present invention will be described below in detail with reference to the accompanying drawings.

As shown in FIG. 1, a transform matrix for making the 16-point Hadamard transform for 16 pieces of one-dimensional input data has a matrix size of 16×16. This transform matrix is designated by a symbol $H_{16}$. When 16 pieces of input data or elements of transform coefficients are enumerated, it is very difficult to see the one-dimensional arrangement of them.

Thus, in this specification, the Hadamard transform is described with the 16-point Hadamard transform when it is easier to recognize as one-dimensional 16-point Hadamard transform, or described with the two-dimensional 4×4-point Hadamard transform when it is easier to recognize as two-dimensional 4×4-point Hadamard transform. The one-dimensional 16-point Hadamard transform can be rewritten into the two-dimensional 4×4-point Hadamard transform equivalently, whereby no strictness is lost by seeing the same transform in a different dimension.

Specifically, the one-dimensional transform using the matrix as shown in FIG. 1 is also implemented by the two-dimensional transform as shown in the formula (6) below. In the formula (6), a matrix having the elements $d_0$ to $d_{15}$ in the center is obtained by arranging 16 pieces of one-dimensional data in 4×4.

[Formula 6]

$$\frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} d0 & d4 & d8 & d12 \\ d1 & d5 & d9 & d13 \\ d2 & d6 & d10 & d14 \\ d3 & d7 & d11 & d15 \end{bmatrix} \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6)$$

The transform result (transform coefficients) of the formula (6) is obtained as a 4×4 matrix.

First Embodiment

A method for acquiring the Hadamard transform coefficients capable of reversible transform will be described below in this embodiment. This transform process comprises a linear transforming step of making the normal Hadamard transform, and a rounding step of rounding to the whole number the linear transform coefficients having the data below the decimal point acquired at the linear transforming step. That is, in this embodiment, the Hadamard transform coefficients capable of reversible transform can be obtained in a very simple way by performing the rounding process only once for each of the transform coefficients obtained by the normal Hadamard transform. The rounding step that is a feature of this embodiment comprises a step of adding an offset matrix and a step of computing a floor function.

Figure 2:
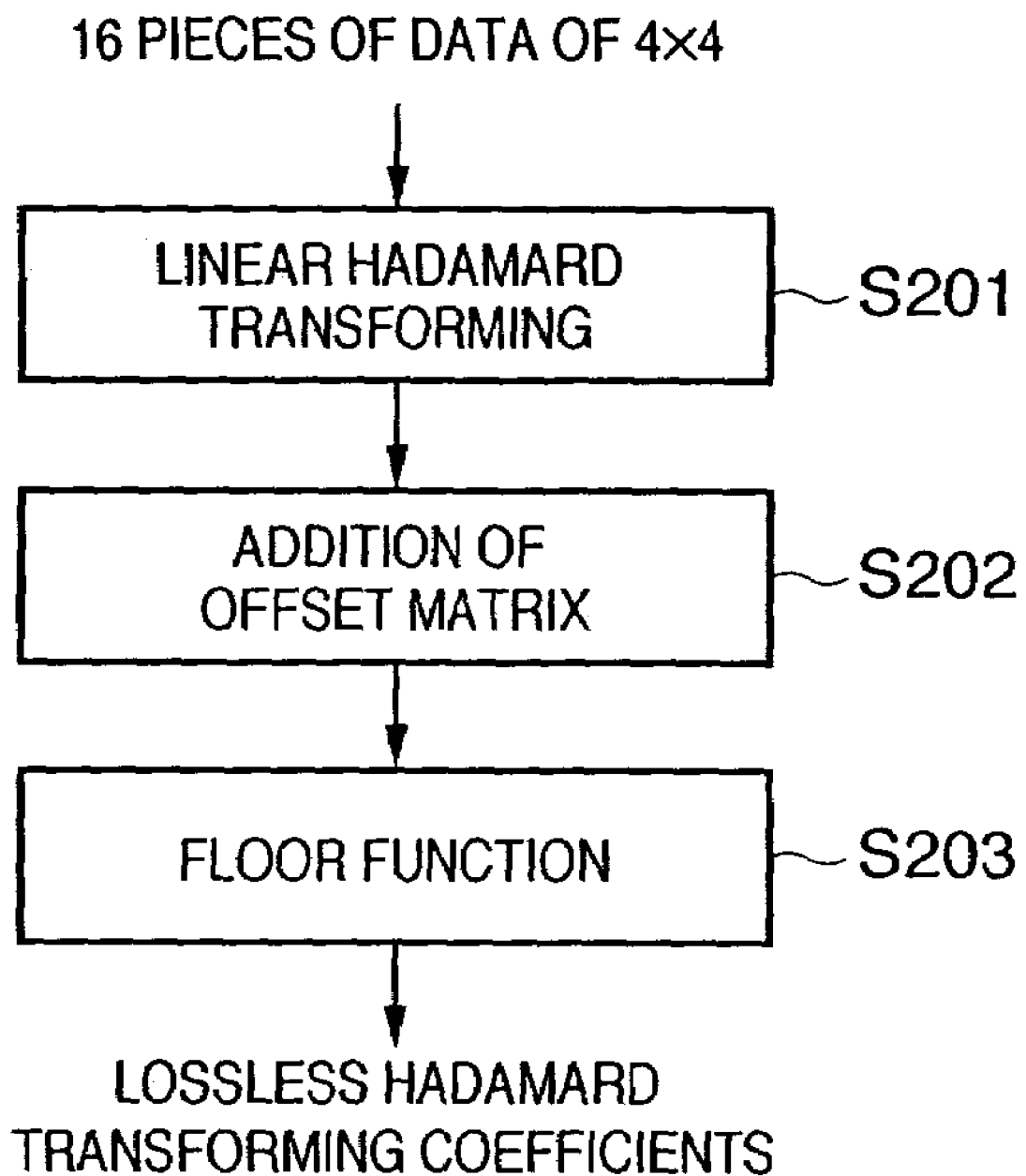
FIG. 2 is a flowchart showing a lossless Hadamard transform process in this embodiment.

FIG. 2 is a flowchart showing the Hadamard transform process in this embodiment. Step S201 comprises performing the linear Hadamard transform process by the conventional arithmetical operation. And step S202 comprises adding the offset matrix, and step S203 comprises computing the floor function. Herein, floor(x) is a function of outputting the maximum integer value not exceeding x. The steps S202 and S203 are the rounding process of this embodiment.

When the offset matrix added at step S202 has a specific structure, the Hadamard transform coefficients capable of reversible transform can be obtained through such process. The elements and structure of the offset matrix will be described below in detail.

[Offset Matrix]

First of all, the kinds of elements of the offset matrix in this embodiment will be described below. The values of the elements of the offset matrix are 0, 0.25, 0.5 and 0.75. These four values are the values below the decimal point of the transform coefficients occurring as the multiplication result of a factor 1/4 for the transform matrix as shown in FIG. 1. Specifically, the transform coefficients of 8.75, 4.5, 1.25 and 6.0 may occur. For example, to raise to a unit 8.75 to obtain an integer value, it is necessary that 0.25 is added. Similarly, to raise to a unit 4.5 and 1.25, it is necessary that 0.5 and 0.75 are added, respectively. Also, not to raise to unit any value, it is necessary that 0 is added. Hence, raising to a unit the value below the decimal point depends on the offset to be added, in which the offset is decided independently for each of 16 transform coefficients. The value below the decimal point remaining after adding the offset is truncated by a floor function at the latter stage.

As described above, the elements of the offset matrix in this embodiment may be four kinds of 0, 0.25, 0.5 and 0.75. These four kinds of values starting from 0 at a step of 0.25 can be represented by two bits indicating the figures below the decimal point. The offset matrix with which the lossless Hadamard transform coefficients can be obtained in this embodiment greatly depends on a pattern structure of two bit planes. This structure will be described below.

Two bit planes have a size of 4×4. The number of kinds of binary patterns in the bit planes having a size of 4×4 is 2 to the sixteenth power in total, and among others, there are 896 kinds meaningful as the offset matrix. For the 896 kinds of patterns, the number of "1" in the row direction is unified to be odd or even for all the four rows, the number of "1" in the column direction is unified to be odd or even for all the four columns, and the sum of "1" over all the pattern is 6 or 10.

For instance, denoting the element at the ith row and the jth column of the bit plane to be $a_{ij}$ ($0 \leq i \leq 3$, $0 \leq j \leq 3$, $a_{ij}=0$ or 1), there are 896 kinds of bit planes satisfying the following three conditions (A1), (A2) and (A3) for a bit plane matrix as shown in the formula (7) below.

[Formula 7]

$$\begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix} \quad (7)$$

(A1) $a_{i0}+a_{i1}+a_{i2}+a_{i3}$ is odd or even for all i.
(A2) $a_{0j}+a_{1j}+a_{2j}+a_{3j}$ is odd or even for all j.
(A3) $\Sigma a_{ij}=6$ or 10

The condition (A1) means that the sum of four bits in the row direction is unified to be odd or even for all the rows, and the condition (A2) means that the sum of four bits in the column direction is unified to be odd or even for all the columns. Herein, denoting the pattern in which the sum of bits in the row direction is odd and the sum of bits in the column direction is even as an odd-even pattern, the bit planes are classified into four kinds of patterns odd-odd, odd-even, even-odd and even-even. FIG. 3 shows the specific examples of four classified patterns.

The patterns in which the sum of bits in the row or column direction is unified to be odd or even, namely, the patterns satisfying the conditions (A1) and (A2), exist in 512 kinds for each of four classified patterns, or 2048 kinds in total. Among these patterns, the patterns satisfying the condition (A3), namely, the number of "1" being 6 or 10, are effective as the offset matrix of lossless transform, and the number of kinds of patterns is 896 for a total of 2048 kinds. In more detail, there are 320 kinds of odd-odd pattern, and 192 kinds of each of other classified patterns, and there are 320+192×3=896 kinds in total.

It is difficult to prove mathematically why these patterns are effective as the offset matrix. However, the present applicant has confirmed that they are actually effective by simulation.

The 896 kinds of patterns are effective for each of two bit planes, but all the combinations, or 896×896 kinds, are not effective as the offset matrix, and a part of the combinations satisfying the following condition (A4) are only effective.

(A4) The patterns of bit plane obtained by taking exclusive OR for two bit planes are 896 kinds as previously mentioned.

The number of "1" existing at the same position is limited to the odd number for two bit planes satisfying this condition, as will be clear from the following explanation.

Since the number of "1" in each of two bit planes is 6 or 10 from the condition (A3), the number of "1" existing on the bit plane at the first decimal place is 10 and the number of "1" existing on the bit plane at the second decimal place is 6, for example, whereby the number of "1" is in four combinations.

In this case, assuming that the number of "1" possibly existing common to both the bit planes is m, the number of "1" on the bit plane obtained by taking the exclusive OR is 10+6−2m. Herein, the term −2m indicates that the number of "1" is decreased by 2, because the exclusive OR at the position where "1" commonly exists results in "0". From the conditions (A3) and (A4), m=3 or 5, because 10+6−2m must be equal to 6 or 10.

By similar computation, when the number of "1" existing on the bit plane at the first decimal place is 6 and the number of "1" existing on the bit plane at the second decimal place is 6, the number m of "1" existing common to both the bit planes is m=1, 3. Also, when the number of "1" existing on the bit plane at the first decimal place is 10 and the number of "1" existing on the bit plane at the second decimal place is 10, the number m=5, 7. In this way, two values of m are obtained for each combination.

The offset value in this embodiment is decided in the following way. For instance, the offset value at the position where "1" commonly exists is 0.75 (=3/4), and when the number of "1" existing on the bit plane at the first decimal place is 10 and the number of "1" existing on the bit plane at the second decimal place is 6, the offset value for remaining 10−m positions of "1" at the first decimal place is 0.5 (=2/4), and the offset value for remaining 6−m positions of "1" at the second decimal place is 0.25 (=1/4). And the offset value for the finally remaining 16−{m+(10−m)+(6−m)}=m positions is 0 (=0/4).

Herein, the 16 offset values for four combinations of the number of "1" on the bit planes at the first decimal place and the second decimal place are itemized in due order in FIG. 4. In FIG. 4, when the number of "1" existing on the bit plane at the first decimal place is 10 and the number of "1" existing on the bit plane at the second decimal place is 6, it is indicated that the offset value 3/4 occurs three or five. In this case, when the offset value 3/4 occurs three, the offset value 2/4 occurs seven, the offset value 1/4 occurs three, and the offset value 0/4 occurs three. Also, when the offset value 3/4 occurs five, the offset value 2/4 occurs five, the offset value 1/4 occurs one, and the offset value 0/4 occurs five, as will be seen from the table.

From FIG. 4, it will be found that the offset matrixes in this embodiment are classified into eight kinds in which the numbers of four offset values 3/4, 2/4, 1/4 and 0/4 are (1,5,5,5), (3,3,3,7), (3,3,7,3), (5,1,5,5), (3,7,3,3), (5,5,1,5), (5,5,5,1) and (7,3,3,3), all the numbers being odd. In all the patterns, three kinds of offset values occur 3 or 5. Specific examples of the eight kinds of offset matrixes are shown in FIGS. 5A and 5B.

In FIGS. 5A and 5B, in an example of the offset matrix with (1,5,5,5) as indicated at the top stage of FIG. 5A, the odd-even pattern is employed for the bit plane at the first decimal place, and the odd-odd pattern is employed for the bit plane at the second decimal place. More particularly, the matrix on the left side represents the offset matrix for 16-point lossless Hadamard transform, the first term on the right side represents the bit plane at first decimal place, and the second term represents the bit plane at second decimal place. Since the weight of bit at the first decimal place is 1/2, and the weight of bit at the second decimal place is 1/4, the matrix in the first term is multiplied by 1/2 and the matrix in the second term is multiplied by 1/4.

The bit plane in the first term is the odd-even pattern in which the sum of "1" over the row or column is 3, 1, 1 and 1 in the order of the zeroth to third rows, and 0,2,2,2 in the order of the zeroth to third columns. Also, the bit plane in the second term is the odd-odd pattern in which the sum of "1" is 1, 1, 1 and 3 in the order of the zeroth to third rows, and 3,1,1,1 in the order of the zeroth to third columns. The total sum of "1" is 6 for both the bit planes, satisfying the conditions (A1), (A2) and (A3) as previously described.

Moreover, the exclusive OR between the two bit planes is (1,1,1,1 1,1,0,0 1,0,1,0 0,1,1,0), in which the sum of "1" in the bit plane is 4,2,2,2 in the order of the zeroth to third rows, and 3,3,3,1 in the order of the zeroth to third columns. And since the total sum of "1" is 10, the condition (A4) is satisfied.

The present applicant has confirmed that 320 patterns of the bit plane at the second decimal place satisfying the limiting conditions exist for one pattern of the bit plane at the first decimal place. Hence, the number of offset matrixes that can be effectively used is 896×320=286720. As it is impossible to present all the offset matrixes here, a part of them are shown in FIG. 6.

At step S202 of FIG. 2, the above offset matrix is added to the linear Hadamard transform coefficients, and at step S203, the floor function value is obtained to acquire the lossless Hadamard transform coefficients.

[Offset Matrix for Reverse Transform]

In order that the certain transform is lossless, it is necessary to show its reversibility. That is, it is necessary to present a reversible reverse transform process.

A processing procedure of the reverse transform for the lossless Hadamard transform in this embodiment is the same as that of the forward transform. That is, the reverse transform is made based on the flowchart of FIG. 2, but the offset matrix to be added at step S202 is different from that employed in the forward transform.

The offset matrix (hereinafter referred to as a second offset matrix) R as employed in the reverse transform is obtained in the following way, based on the offset matrix F as employed in the forward transform (hereinafter referred to as a first offset matrix). The relationship between the first offset matrix F and the second offset matrix R is one feature of the lossless transform in this embodiment.

First of all, when two bit planes for the first offset matrix F are interpreted as the binary matrixes composed of the elements "0" and "1", ignoring their weights, two binary matrixes in the second offset matrix R are obtained by the following formula (8).

[Formula 8]

$$R^i_{4\times 4} = -H_4 \left\{ F^i_{4\times 4} - \frac{1}{2}\begin{bmatrix} 1 & 1 & 1 & 1 \\ 1 & 1 & 1 & 1 \\ 1 & 1 & 1 & 1 \\ 1 & 1 & 1 & 1 \end{bmatrix} \right\} H_4 + \frac{1}{2}\begin{bmatrix} 1 & 1 & 1 & 1 \\ 1 & 1 & 1 & 1 \\ 1 & 1 & 1 & 1 \\ 1 & 1 & 1 & 1 \end{bmatrix} \quad (8)$$

In the formula (8), F designates the offset matrix of forward transform, R designates the offset matrix of reverse transform, and $R^i$, $F^i$ designate the binary matrixes of bits at the ith place of decimals.

Two binary matrixes $R^1$, $R^2$ obtained by the formula (8) are multiplied by the corresponding weights 1/2, 1/4, and added to obtain the offset matrix for reverse transform. This arithmetical operation is shown in the formula (9).

[Formula 9]

$$R_{4\times 4} = \frac{1}{2}R^1_{4\times 4} + \frac{1}{4}R^2_{4\times 4} \quad (9)$$

If the reverse transform is made using the second offset matrix R, the original data before transform is restored. The mathematical proof for this operation has not been made at the present time. However, it is generally well known that to verify the reversibility for all kinds of data, it is unnecessary to confirm the reversibility for all kinds of data, but it is only necessary to confirm the reversibility for partial specific data. One series of lossless transforms as described in this specification has no practical problem, because the reversibility for the partial specific data has been actually confirmed by the present applicant.

On the other hand, the first offset matrix F is not divided into two binary matrixes but may be directly employed with weight to obtain the second offset matrix R. An offset transform expression corresponding to two bits of the figures below the decimal point is shown in the formula (10).

[Formula 10]

$$R_{4\times 4} = -H_4 \left\{ F_{4\times 4} - \frac{3}{8}\begin{bmatrix} 1 & 1 & 1 & 1 \\ 1 & 1 & 1 & 1 \\ 1 & 1 & 1 & 1 \\ 1 & 1 & 1 & 1 \end{bmatrix} \right\} H_4 + \frac{3}{8}\begin{bmatrix} 1 & 1 & 1 & 1 \\ 1 & 1 & 1 & 1 \\ 1 & 1 & 1 & 1 \\ 1 & 1 & 1 & 1 \end{bmatrix} \quad (10)$$

In the formula (10), $R_{4\times 4}$, $F_{4\times 4}$ are the matrixes having a range of two bits of the figures below the decimal point. Herein, the offset matrix $F_{4\times 4}$ for forward transform and the offset matrix $R_{4\times 4}$ for reverse transform are actually shown below.

[Formula 11]

$$F_{4\times 4} = \frac{1}{4}\begin{bmatrix} 2 & 3 & 3 & 3 \\ 1 & 2 & 0 & 2 \\ 1 & 0 & 2 & 2 \\ 1 & 2 & 2 & 0 \end{bmatrix} \quad R_{4\times 4} = \frac{1}{4}\begin{bmatrix} 1 & 2 & 2 & 2 \\ 0 & 1 & 3 & 1 \\ 0 & 3 & 1 & 1 \\ 0 & 1 & 1 & 3 \end{bmatrix} \quad (11)$$

[Lossless Transform/Reverse Transform]

The lossless Hadamard transform coefficients are actually computed, employing the offset matrix $F_{4\times 4}$ for forward transform and the offset matrix $R_{4\times 4}$ for reverse transform, and are reversely transformed to restore the original 4×4 data, as described below. The data as shown in the formula (12) will be described as the original data to be transformed.

[Formula 12]

$$\begin{bmatrix} 18 & 28 & 32 & 25 \\ 8 & 22 & 28 & 24 \\ 9 & 14 & 27 & 23 \\ 7 & 11 & 23 & 20 \end{bmatrix} \quad (12)$$

First of all, if the two-dimensional linear Hadamard transform is made for the 4×4 data, the result as shown in the formula (13) is obtained (corresponding to step S201).

[Formula 13]

$$H_4 \begin{bmatrix} 18 & 28 & 32 & 25 \\ 8 & 22 & 28 & 24 \\ 9 & 14 & 27 & 23 \\ 7 & 11 & 23 & 20 \end{bmatrix} H_4 = \begin{bmatrix} 21 & 37.5 & 55 & 46 \\ 6 & 4.5 & 4 & 2 \\ 5 & 12.5 & 5 & 3 \\ 4 & 1.5 & 0 & -1 \end{bmatrix} \quad (13)$$

$$H_4 = \begin{bmatrix} 79.75 & -3.75 & -21.25 & -12.75 \\ 8.25 & 1.75 & 2.25 & -0.25 \\ 12.75 & -2.75 & 4.75 & -4.75 \\ 2.25 & 1.75 & 3.25 & 0.75 \end{bmatrix}$$

If the linear Hadamard transform coefficients are rounded, employing the offset matrix $F_{4\times 4}$ for forward transform (corresponding to steps S202, S203), the lossless transform coefficients are obtained as shown in the formula (14).

[Formula 14]

$$\begin{bmatrix} 80 & -3 & -21 & -12 \\ 8 & 2 & 2 & 0 \\ 13 & -3 & 5 & -5 \\ 2 & 2 & 3 & 0 \end{bmatrix} \quad (14)$$

Next, the two-dimensional linear Hadamard reverse transform is made for the 4×4 lossless transform coefficients as shown in the formula (14). Since the transform matrix is a normal symmetric matrix, the reverse transform performs the same processing as the forward transform, as shown in the formula (15) (corresponding to step S201).

[Formula 15]

$$H_4 \begin{bmatrix} 80 & -3 & -21 & -12 \\ 8 & 2 & 2 & 0 \\ 13 & -3 & 5 & -5 \\ 2 & 2 & 3 & 0 \end{bmatrix} H_4 = \begin{bmatrix} 51.5 & -1 & -5.5 & -8.5 \\ 41.5 & -5 & -10.5 & -8.5 \\ 36.5 & 0 & -13.5 & -3.5 \\ 30.5 & 0 & -12.5 & -3.5 \end{bmatrix} H_4$$

$$= \begin{bmatrix} 18.25 & 27.75 & 32.25 & 24.75 \\ 8.75 & 22.25 & 27.75 & 24.25 \\ 9.75 & 13.25 & 26.75 & 23.25 \\ 7.25 & 10.75 & 23.25 & 19.75 \end{bmatrix} \quad (15)$$

If this result is rounded employing the offset matrix $R_{4\times 4}$ for reverse transform (corresponding to steps S202, S203), the data as shown in the formula (16) is obtained. This is exactly the same as the original data as shown in the expression (12), whereby it will be found that the data is completely restored.

[Formula 16]

$$\begin{bmatrix} 18 & 28 & 32 & 25 \\ 8 & 22 & 28 & 24 \\ 9 & 14 & 27 & 23 \\ 7 & 11 & 23 & 20 \end{bmatrix} \quad (16)$$

As described above, with this embodiment, the 16-point lossless Hadamard transform is implemented by the linear Hadamard transform and one rounding process for each transform coefficient.

Specifically, the 16-point lossless Hadamard transform with less rounding error is implemented by performing a rounding process comprising truncating the figures after the decimal fractions for an odd number of coefficients that are part of the 16 linear Hadamard transform coefficients, adding 0.25 and truncating the figures after the decimal fractions for other partial odd number of coefficients, adding 0.5 and truncating the figures after the decimal fractions for further other partial odd number of coefficients, and adding 0.75 and truncating the figures after the decimal fractions for remaining other partial odd number of coefficients.

There is a feature that the lossless Hadamard transform coefficients obtained in this embodiment have small differences from the general linear Hadamard transform coefficients to be highly compatible.

Second Embodiment

A second embodiment of the invention will be described below.

The second embodiment has a feature of making the entropy coding such as Huffman coding for the lossless Hadamard transform coefficients computed in the first embodiment.

Herein, in Tadayoshi Nakayama, Madoka Hasegawa and Shigeo Kato, "A PSNR improved method for Rossi-Hadamard transform and application to lossless Hadamard transform coding", Gadenshi, Vol. 32, No. 5, pp. 700-708, September 2003 (document 2), it was proposed that the lossless Hadamard transform is implemented by switching the rounding process depending on whether the total sum of 4×4 data for Hadamard transform is odd or even.

The switching of the rounding process as described in the document 2 means preparing two kinds of offset matrixes, and switching the offset matrixes depending on whether the total sum of data for Hadamard transform is odd or even. This switching of the rounding process is liable to increase the entropy because the values of transform coefficients are more likely to disperse.

On the contrary, in the lossless Hadamard transform coefficients of the invention, since only one offset matrix is employed in the rounding process as described in the first embodiment, the dispersion of transform coefficient values is suppressed, whereby the entropy is slightly smaller than with the method of the patent document 2. Its difference is shown in FIG. 7. The entropy values as shown in FIG. 7 are based on the actual measurement values by the applicant.

Figure 8:
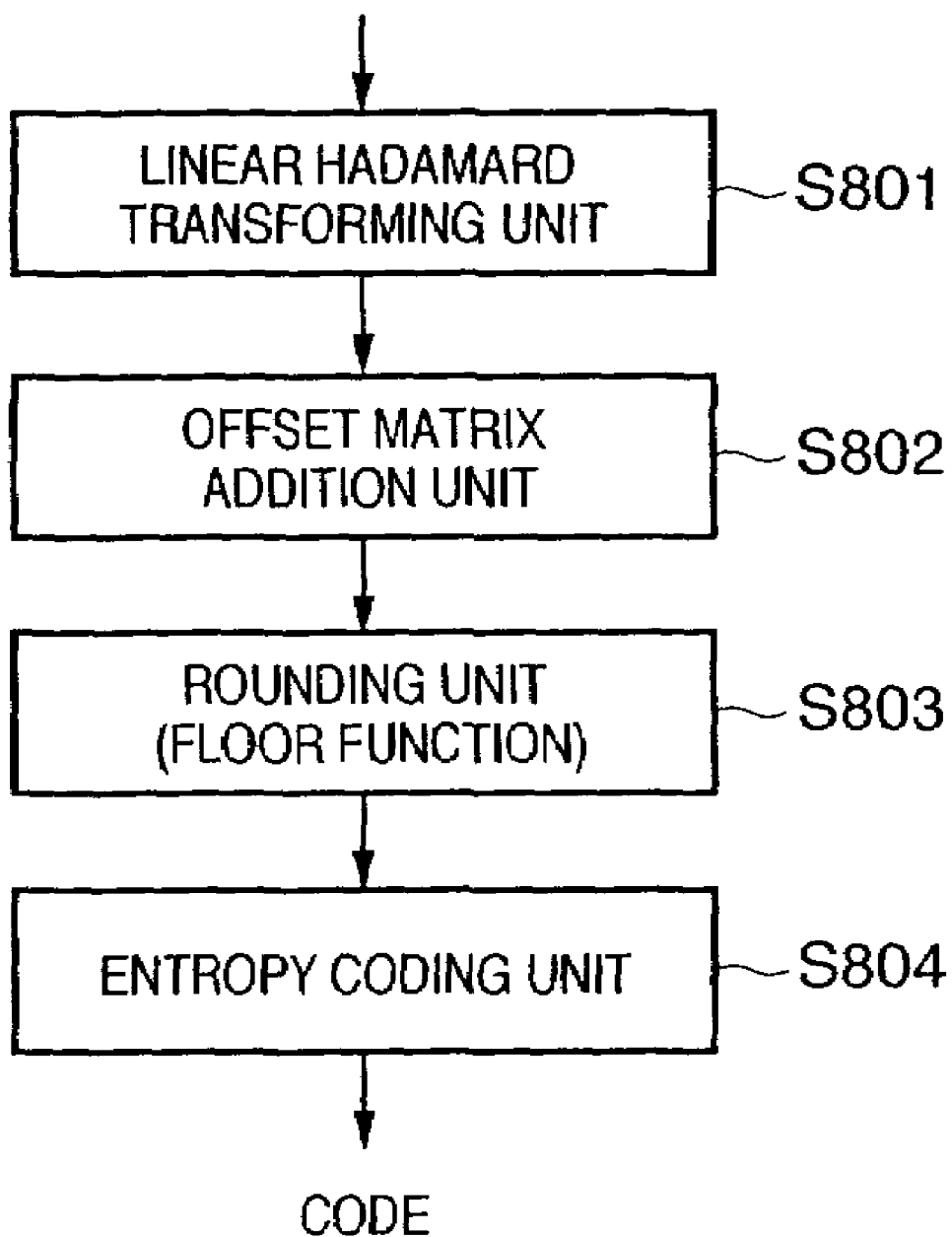
FIG. 8 is a block diagram showing the configuration of a coding device using the lossless Hadamard transform according to a second embodiment of the invention.

FIG. 8 shows a configuration example of the coding device for implementing the second embodiment. In FIG. 8, if the 4×4 data to be transformed is inputted, the linear Hadamard transform is firstly performed in a linear Hadamard transform part 801 (corresponding to step S201 of FIG. 2), and then the offset matrix is added in an offset matrix addition part 802 (corresponding to step S202 of FIG. 2). And the rounding process with the floor function is performed in a rounding processing part 803 (corresponding to step S203 of FIG. 2), whereby the lossless Hadamard transform coefficients as described in the first embodiment are obtained. And the entropy coding process for the transform coefficients is performed in an entropy coding part 804, whereby the code with less entropy is obtained than ever before.

As described above, with the second embodiment, by making the entropy coding for the lossless Hadamard transform coefficients as acquired in the first embodiment, the entropy coding with less coding amount can be made than ever before.

Third Embodiment

A third embodiment of the invention will be described below.

The third embodiment has a feature that the lossless Hadamard transform coefficients computed in the first embodiment are applied to a DCT (Discrete Cosine Transform) process for use in a JPEG coding process.

The DCT transform is mathematically reversible. However, if the arithmetical operation is performed at a limited bit precision, an operation error occurs. Even when quantization is made at a quantization step 1, the original data is not restored by the reverse transform. Thus, a method for converting the whole DCT transform into the lossless transform by subdividing the DCT transform process into several sub-processes and replacing each sub-process with the lossless transform has been examined.

However, this method has a problem that when the DCT transform coefficients obtained by the lossless DCT transform (hereinafter referred to as a lossless DCT transform) are reversely transformed by the general DCT transform process, the data is degraded. Of course, when the DCT transform coefficients are transformed by the general DCT transform process and reversely transformed, the data is naturally degraded, because it is not the lossless transform, but the data is more greatly degraded.

The greatest factor of this degradation is that a rounding error occurring in the rounding process in performing the lossless transform occurs in each of the subdivided processes. Even if each rounding error is small, the total rounding error becomes significant in the DCT transform as a whole. To reduce this error, it is conceived that the lossless transform is implemented in a greater processing unit by avoiding subdividing the DCT transform process.

According to Shinji Fukuma, Kouichi Oyama, Masahiro Iwahashi, Noriyoshi Kamibayashi, "Lossless 8-point fast discrete cosine transform applying lossless Hadamard transform", Shingaku Giho, DSP99-103, pp. 37-44, October 1999 (document 3), it is pointed out that the 8-point DCT transform process is divided into the 4-point Hadamard transform process and the other rotation process, and the lossless 4-point Hadamard transform is applied to the 4-point Hadamard transform process.

Since the 8-point DCT transform in the document 3 is linear, the 8-point DCT transform is applied in each of the horizontal and vertical directions, whereby the two-dimensional DCT transform can be performed. It is the two-dimensional DCT transform that is required in the JPEG coding.

The 4-point Hadamard transform within the one-dimensional DCT transform is replaced with the 4×4 16-point Hadamard transform in the two-dimensional DCT transform. This replacement is made simply by mathematical transformation of the formula, which is an evident nature in the linear algebra. In Kuninori Komatsu and Kaoru Sesaki, "Two-dimensional lossless transform and its application to image coding", Shingaku Giho, IE2000-65, pp. 19-26, October 2000 (document 4), it is mathematically proved that the 2-point Hadamard transform within the one-dimensional DCT transform is replaced with the 2×2 4-point Hadamard transform in the two-dimensional DCT transform. The above replacement is easily inferred from the document 4.

Thereby, it will be found that the 16-point lossless Hadamard transform of the invention is applicable to the two-dimensional lossless DCT transform. Accordingly, the two-dimensional lossless DCT transform with a small number of rounding processes and less rounding error can be implemented.

Figure 9:
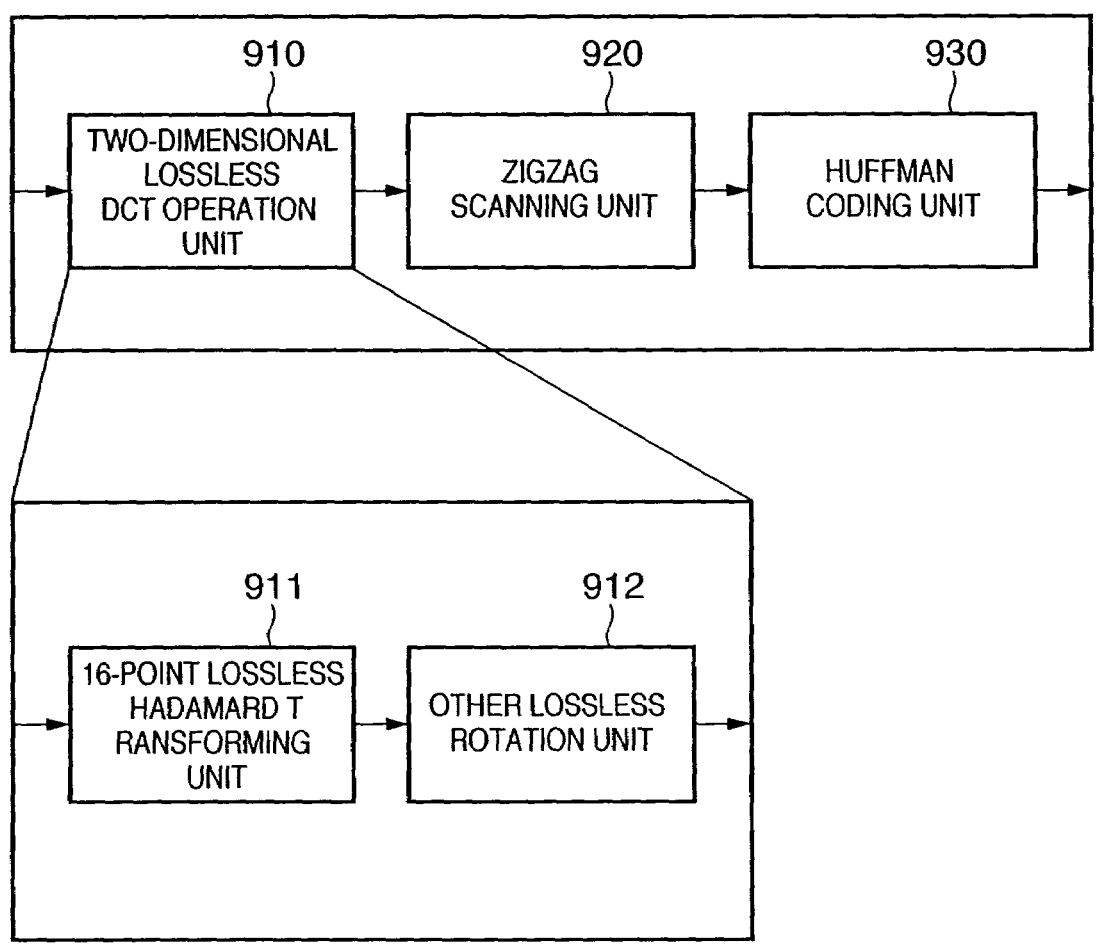
FIG. 9 is a block diagram showing the configuration of a JPEG coding device using the lossless Hadamard transform according to a third embodiment of the invention.

FIG. 9 shows a block configuration example of the JPEG coding device using the 16-point lossless Hadamard transform according to the third embodiment of the invention. This JPEG coding device has a reversible transform function. The reversible transform occurs only if the quantization step is 1.

In FIG. 9, a two-dimensional lossless DCT operation part 910 comprises a 16-point lossless Hadamard transform part 911, and the other lossless rotation part 912. The 16-point lossless Hadamard transform part 911 performs the 16-point lossless Hadamard transform process as shown in the first embodiment, and the other lossless rotation part 912 performs the other rotation process to implement the two-dimensional lossless DCT transform. And a Huffman coding process 930 performs a Huffman coding process for the DCT coefficients zigzag scanned by a zigzag scanning part 920 to obtain the JPEG code.

As described above, with the third embodiment, the two-dimensional lossless DCT transform with a smaller number of rounding processes and less rounding error is enabled by applying the 16-point lossless Hadamard transform as described in the first embodiment to the two-dimensional lossless DCT transform. That is, when the reverse transform is performed in the general two-dimensional DCT process, the degradation of data is suppressed.

If the two-dimensional lossless DCT transform is applied to the JPEG coding, the reversible coding can be achieved when the quantization step is 1, and even if the code obtained as a result of the JPEG coding is decoded using the general two-dimensional DCT, the degradation of decoded image is suppressed. That is, the reversible coding device that is highly compatible with the general irreversible coding device can be provided.

The JPEG coding has been described as an application of the lossless DCT coding, but a reversible coding can be achieved even in another coding method by replacement by lossless DCT.

Fourth Embodiment

A fourth embodiment of the invention will be described below.

The fourth embodiment provides a method for generating the 16-point lossless Hadamard transform coefficients that can be generated in the first embodiment, namely, the transform coefficients obtained by one rounding process through another process.

In the fourth embodiment, a process using an even lossless Hadamard transform (described in the document 2) allowing the lossless Hadamard transform only when the sum of 16 pieces of data is even and the parity information is performed.

First of all, the even lossless Hadamard transform in the fourth embodiment will be described below. The 16-point even lossless Hadamard transform is simpler than the 16-point lossless Hadamard transform as described in the first embodiment. This is because the offset matrix to be added before the rounding process can be represented by one bit plane.

When the sum of data is even, the least significant bit (the second bit below the decimal point in this case) of the coefficients normally obtained by the Hadamard transform necessarily becomes zero. Accordingly, the second bit below the decimal point has no influence as the offset matrix, and is not required to consider, whereby it is only necessary to take notice of the first bit below the decimal point. The offset matrix at the first bit below the decimal point is similar to that at the first bit below the decimal point as described in the first embodiment, and not described here.

Before explanation of a parity process in the fourth embodiment, the concept of even parity will be described below. In the even parity, when an even number of 1 exist in n-bit data, the parity bit is 0, and when an odd number of 1 exist in n-bit data, the parity bit is 1.

In the fourth embodiment, the even parity is defined not for the bit data, but for the sum of data subjected to the Hadamard transform. That is, the parity bit takes the value of 0 if the total sum of 16 pieces of data is even, or 1 if it is odd.

[Lossless Hadamard Transform]

Figure 10:
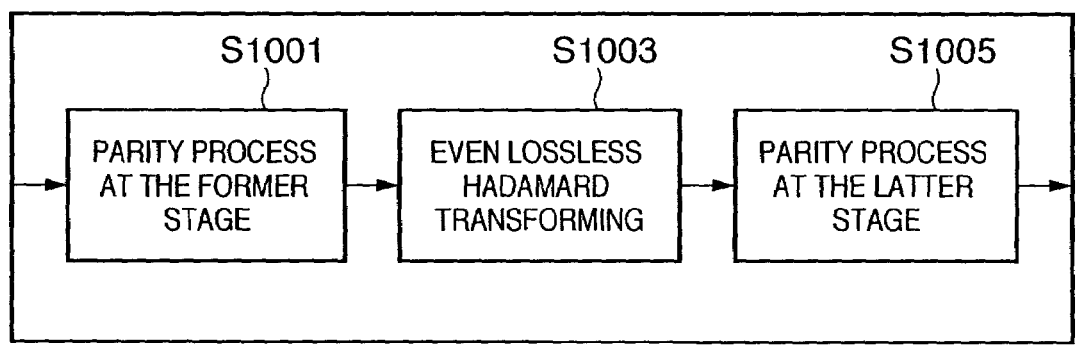
FIG. 10 is a flowchart showing a lossless Hadamard transform process in the fourth and fifth embodiments.

FIG. 10 shows a flowchart of the lossless Hadamard transform process according to the fourth embodiment. First of all, to make even the total sum of data before the Hadamard transform process, the parity bit is obtained at step S1001, and the value of the parity bit is subtracted from the top data of the 16-point data, or the left upper data of 4×4 data. Thereby, the total sum of data after subtraction of the parity bit is necessarily even. And the even lossless Hadamard transform is applied to the data at step S1003. The parity operation and parity subtraction process before the lossless Hadamard transform at step S1001 is hereinafter referred to as a "parity process at the former stage".

Herein, the lossless transform has a feature that the parity is preserved. That is, the odd-even property of the sum of data before transform and the odd-even property of the sum of coefficients after transform are matched. Accordingly, if the parity process at the former stage (S1001) and the even lossless Hadamard transform process (S1003) are performed for the data having the odd total sum, the total sum of transform coefficients is necessarily even. Also, the total sum of transform coefficients for the data having the even total sum is naturally even. Consequently, there is no state where the total sum of transform coefficients becomes odd, so that the number of states degenerates. As a result, the reversibility is lost.

Thus, in the fourth embodiment, to append the information that the sum of original data is odd to the transform coefficients, the parity bit is added to the odd number of coefficients among the transform coefficients at step S1005. The odd number is specifically 1, 3, 5 or 7. The parity addition process after the even lossless Hadamard transform at step S1005 is hereinafter referred to as a "parity process at the latter stage". When the total sum of original data is even, the transform coefficients are not changed by addition (+0) of the parity bit. However, when the total sum is odd, the total sum of transform coefficients is odd, because the parity bit is added (+1) to the odd number of transform coefficients. As a result, the odd-even property of the sum of data and the odd-even property of the sum of transform coefficients are matched, whereby the lossless reverse transform is enabled as will be described later.

[Lossless Hadamard Reverse Transform]

The lossless Hadamard reverse transform is performed in accordance with an inverse procedure to the flowchart as shown in FIG. 10. That is, first of all, corresponding to step S1005, the parity bit is obtained from the sum of transform coefficients, and subtracted from the transform coefficients to which the parity bit in the forward transform is added. Herein, since the odd-even property of the sum of data and the odd-even property of the sum of transform coefficients are matched, the parity bit obtained from the transform coefficients is the same value as that of the original data.

The sum of transform coefficients after subtraction of the parity bit returns to the even number, and the reverse transform process of the even lossless Hadamard transform corresponding to step S1003 is performed. In this reverse transform process, the offset matrix for reverse transform, which is reverse to the offset matrix used in the forward transform, is employed. Finally, corresponding to step S1001, the parity bit is added to the top of reversely transformed data.

Equivalency with the First Embodiment

In the following, it is demonstrated that the lossless Hadamard transform process in the fourth embodiment is equivalent to the transform process in the first embodiment. Herein, the lossless Hadamard transform of the first embodiment using the offset matrix composed of 2 bit planes as shown in the formula (17) is replaced with the parity process at the former stage (S1001), the even lossless Hadamard transform process (S1003) and the parity process at the latter stage (S1005) in the fourth embodiment. The offset matrix as shown in the formula (17) is effective regardless of whether the total sum of data is odd or even.

[Formula 17]

$$\frac{1}{4}\begin{bmatrix} 2 & 3 & 3 & 3 \\ 1 & 2 & 0 & 2 \\ 1 & 0 & 2 & 2 \\ 1 & 2 & 2 & 0 \end{bmatrix} \quad (17)$$

Herein, first of all, a case where the total sum of data is limited to the even number is considered. In this case, the offset matrix has a degree of freedom. In the following formula (18), an example of the offset matrix in which the total sum of data is limited to the even number is shown. The transform result using the offset matrix in the formula (17), which is effective when the sum is any of the odd and even numbers, and the transform result using various offset matrixes in the formula (18) when the sum is limited to the even number are identical.

[Formula 18]

$$\frac{1}{2}\begin{bmatrix} 1 & 1 & 1 & 1 \\ 0 & 1 & 0 & 1 \\ 0 & 0 & 1 & 1 \\ 0 & 1 & 1 & 0 \end{bmatrix} \text{ or} \quad (18)$$

$$\frac{1}{4}\begin{bmatrix} 2/3 & 2/3 & 2/3 & 2/3 \\ 0/1 & 2/3 & 0/1 & 2/3 \\ 0/1 & 0/1 & 2/3 & 2/3 \\ 0/1 & 2/3 & 2/3 & 0/1 \end{bmatrix} \quad 0/1 \text{ is 0 or 1, and } 2/3 \text{ is 2 or 3.}$$

In this way, in the transform process when the total sum of data is even, there is no influence from the parity processes at the former and latter stages, whereby the same processing result as in the first embodiment is obtained even when the processing procedure as shown in FIG. 10 is applied.

Next, a case where the total sum of data is limited to the odd number is considered. In this case, to obtain the same processing result as in the first embodiment by applying the processing procedure of FIG. 10, it is required that the offset matrix used in the even lossless Hadamard transform at step S1003 is changed as follows. That is, after adding 1/4 to all the elements of the formula (17), 4/4 is replaced with 0/4. Thereby, the offset matrix as shown in the formula (19) is obtained.

[Formula 19]

$$\frac{1}{4}\begin{bmatrix} 3 & 0 & 0 & 0 \\ 2 & 3 & 1 & 3 \\ 2 & 1 & 3 & 3 \\ 2 & 3 & 3 & 1 \end{bmatrix} \quad (19)$$

In the offset matrix of the formula (19), 1 is added to the position (right upper, three transform coefficients) where 4/4 is replaced with 0/4 in the parity process at the latter stage (S1005).

In the following, it is demonstrated that the transform process of the fourth embodiment is equivalent to the transform process of the first embodiment, namely, the same result is obtained when the transform process as shown in the flowchart of FIG. 10 using the offset matrix of the formula (19) is performed and when the transform process using the offset matrix of the formula (17) is performed.

As already described, the parity process at the former stage (S1001) is equivalent to truncating the least significant bit (the second bit below the decimal point) of the Hadamard transform coefficients, which are all 1 where the total sum of data is odd. In other words, it is equivalent to subtracting 1/4 from all the transform coefficients. Hence, it is said that addition of 1/4 to all the elements of the offset matrix in the formula (17) has the effect of canceling the parity process at the former stage (S1001). For the elements becoming the integer value (4/4) by addition of 1/4, the addition is made after truncate, because the results of addition before and after truncating the figures after the decimal fractions are the same.

Thereby, the range of elements of the offset matrix to be added before truncating the figures after the decimal fractions is from 0 to 3/4, which is the same range as the original data. In other words, the offset matrix is the same kind as the original offset matrix. And the addition of integer value moved after truncating the figures after the decimal fractions is performed as the parity process at the latter stage (S1005). Accordingly, the transform result based on the flowchart of FIG. 10 is the same as the transform result in the first embodiment.

The number of adding the integer value moved after truncating the figures after the decimal fractions, which is equal to the number where the offset value in the offset matrix of the formula (17) is 3/4, is 1, 3, 5 or 7 from FIG. 4.

Since the total sum of data is even when the even lossless Hadamard transform is made, the offset matrix has a degree of freedom as described above, and the offset matrix that can be represented by one bit plane as shown in the formula (20) may be employed.

[Formula 20]

$$\frac{1}{2}\begin{bmatrix} 1 & 0 & 0 & 0 \\ 1 & 1 & 0 & 1 \\ 1 & 0 & 1 & 1 \\ 1 & 1 & 1 & 0 \end{bmatrix} \quad (20)$$

As described above, with the fourth embodiment, it is possible to obtain the 16-point lossless Hadamard transform coefficients by performing the process using the even lossless Hadamard transform and the parity information with one rounding process in the same way as in the first embodiment.

Modification of the Fourth Embodiment

A modification of the fourth embodiment will be described below.

In the fourth embodiment, to clarify the application of the even lossless Hadamard transform, an instance of subtracting the parity bit from the top data so that the total sum of data may be even has been presented.

However, when the even lossless Hadamard transform is performed with the offset matrix (elements of the matrix are only composed of 0 and 1/2) consisting of the bit plane at the first place of decimals, all the figures at the second place of decimals (all 1 when the total sum of data is odd) for the transform coefficients are truncated. This is equivalent to subtracting the parity bit from the top data in the data before transform.

Therefore, in the fourth embodiment, when the even lossless Hadamard transform is performed using the offset matrix only consisting of the bit plane at the first place of decimals, a modified process may be made in which the parity bit is only obtained and not subtracted at step S1001 of FIG. 10.

Though an instance where all the elements becoming the integer value (4/4) by adding 1/4 in the offset matrix are replaced with 0 (0/4), and 1 is added in the parity process at the latter stage has been described above in the fourth embodiment, a part or all of the offset of integer value may be left behind directly, and added at the same time when adding the offset matrix, unless the range of elements of the offset matrix is limited to from 0 to 3/4.

In this way, since there are various modifications of this kind to expand the range of elements of the offset matrix, many other mathematically equivalent processes that are easily derived by a person skilled in the art may exist. Naturally, they are included in the scope of the invention.

Fifth Embodiment

A fifth embodiment of the invention will be described below.

The fifth embodiment, like the fourth embodiment, provides a lossless Hadamard transform process mathematically equivalent to that of the first embodiment. A fundamental processing flow is the same as shown in FIG. 10 in the fourth embodiment. That is, the parity process at the former stage, the even lossless Hadamard transform process and the parity process at the latter stage are performed.

Though the parity is subtracted from the top data in the parity process at the former stage in the fourth embodiment, the parity may be subtracted and added, and the data for addition or subtraction is not limited to the top data in the fifth embodiment. However, the arithmetical operations and the object data may not be arbitrarily selected, but are limited in the type, depending on the offset matrix for use in the lossless Hadamard transform process of the first embodiment. In the following, taking the offset matrix in the pattern of the formula (21) as an example, an arithmetical operation method in the parity process at the former stage will be described below.

[Formula 21]

$$\frac{1}{4}\begin{bmatrix} 2 & 2 & 2 & 2 \\ 2 & 3 & 1 & 0 \\ 2 & 0 & 3 & 1 \\ 2 & 1 & 0 & 3 \end{bmatrix} \quad (21)$$

When the total sum of data is even, there is no influence of the parity process, whereby the transform result of the fifth embodiment is the same as in the first embodiment and the fourth embodiment. Hence, a case where the total sum of data is odd will be described below.

Under the conditions where the addition result is included from 0 to less than 1, and the elements of ±1/4 make a specific pattern having regularity (as will be detailed later), the following patterns (22) and (23) can be added to the offset matrix as shown in the formula (21).

[Formula 22]

$$\frac{1}{4}\begin{bmatrix} 1 & 1 & -1 & -1 \\ -1 & -1 & 1 & 1 \\ 1 & 1 & -1 & -1 \\ -1 & -1 & 1 & 1 \end{bmatrix} \quad (22)$$

[Formula 23]

$$\frac{1}{2}\begin{bmatrix} 1 & -1 & -1 & 1 \\ 1 & -1 & -1 & 1 \\ -1 & 1 & 1 & -1 \\ -1 & 1 & 1 & -1 \end{bmatrix} \quad (23)$$

Herein, a pattern of the formula (22) is noted.

The formula (22) is added to the formula (21), and the integer value (4/4) is replaced with 0, whereby the formula (24) is obtained.

[Formula 24]

$$\frac{1}{4}\begin{bmatrix} 3 & 3 & 1 & 1 \\ 1 & 2 & 2 & 1 \\ 3 & 1 & 2 & 0 \\ 1 & 0 & 1 & 0 \end{bmatrix} \quad (24)$$

Regarding this as the offset matrix on one bit plane of the even lossless Hadamard transform, the following formula (25) is obtained to satisfy the conditions (A1), (A2) and (A3) as shown in the first embodiment.

[Formula 25]

$$\frac{1}{2}\begin{bmatrix} 1 & 1 & 0 & 0 \\ 0 & 1 & 1 & 0 \\ 1 & 0 & 1 & 0 \\ 0 & 0 & 0 & 0 \end{bmatrix} \quad (25)$$

In the parity process at the latter stage, 1 is added to the position where the integer value (4/4) is replaced with 0 in the formula (24) in the same way as in the fourth embodiment.

When the parity process at the latter stage is performed using the formula (24) as the offset matrix of the lossless Hadamard transform, it is equivalent to adding the formula (22) to the linear Hadamard transform coefficients, then adding the offset matrix of the formula (21) and truncating the figures after the decimal fractions.

It is important here that adding the formula (22) to the linear Hadamard transform coefficients is equivalent to adding the pattern of the formula (26) to the data before the Hadamard transform. This is because the Hadamard transform result of the formula (26) becomes the formula (22). Herein, the "specific pattern" as used in explaining the formulas (22) and (23) means the pattern obtained by making the two-dimensional 4×4 Hadamard transform for the matrix in which 1 is at only one position and 0 at other positions. The formula (23) is the pattern obtained as a result of making the Hadamard transform for the formula (27).

[Formula 26]

$$\begin{bmatrix} 0 & 0 & 0 & 0 \\ 0 & 0 & 1 & 0 \\ 0 & 0 & 0 & 0 \\ 0 & 0 & 0 & 0 \end{bmatrix} \quad (26)$$

[Formula 27]

$$\begin{bmatrix} 0 & 0 & 0 & 0 \\ 0 & 0 & 0 & 0 \\ 0 & 0 & 0 & 1 \\ 0 & 0 & 0 & 0 \end{bmatrix} \quad (27)$$

As will be understood from the above explanation, if the pattern of the formula (26) is subtracted from the data before the Hadamard transform, the addition process of the formula (22) to the linear Hadamard transform coefficients is canceled.

Therefore, when the total sum of data is odd, the parity bit is subtracted from the data at the position of 1 in the formula (26) to make the total sum of data even. Thereafter, the even lossless Hadamard transform is performed using the offset matrix of the formula (24) or (25), and finally the parity process at the latter stage is performed. Its result is the same as the result of making the lossless Hadamard transform of the first embodiment using the offset matrix of the formula (21).

In the fifth embodiment, unlike the fourth embodiment, a modified process of truncating the subtraction of parity in the parity process at the former stage is not allowed.

As described above, with the fifth embodiment, like the fourth embodiment, the lossless Hadamard transform can be implemented without limiting the addition/subtraction of parity and the position of object data in performing the process using the even lossless Hadamard transform and the parity information.

Other Embodiments

The invention may be applied to a system composed of a plurality of devices (e.g., host computer, interface unit, scanner, printer) or an apparatus (e.g., composite apparatus) composed of a single unit.

Also, the object of the invention may be achieved by providing a storage medium (or a recording medium) recording a program code of software that implements the functions of the embodiments to the system or apparatus, and reading and executing the program code stored in the storage medium by the computer (or CPU or MPU) of the system or apparatus. In this case, the program code itself read from the storage medium implements the functions of the above embodiments, and the storage medium storing the program code constitutes the invention. Also, the read program code may be executed by the computer to implement the functions of the above embodiments, and an operating system (OS) running on the computer may perform a part or all of the actual processing, based on the instructions of the program code, to implement the functions of the above embodiments.

Moreover, the program code read from the storage medium may be written into a memory equipped in a function extension card inserted into the computer or a function extension unit connected to the computer, and a CPU equipped on the function extension card or function extension unit may perform a part or all of the actual processing, based on the instructions of the program code, to implement the functions of the above embodiments.

When the invention is applied to the storage medium, the program code corresponding to the flowchart as described in the above description is stored in the storage medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-249021 filed on Aug. 27, 2004, which is hereby incorporated by reference herein.

What is claimed is:

1. A data transform method for acquiring lossless Hadamard transform coefficients for 16 pieces of input image data in 4×4 matrix form and generating a reduced amount of coded data based on the acquired lossless Hadamard transform coefficients, comprising:

one or more computers implementing the following steps of:

a linear transform step of acquiring 16 linear Hadamard transform coefficients by multiplying said 16 pieces of input image data by an Hadamard transform matrix;

an offset step of classifying said 16 linear Hadamard transform coefficients into four groups, each group containing an odd number of coefficients, and adding predetermined offset values to the linear Hadamard transform coefficients in every group;

an integral step of acquiring said lossless Hadamard transform coefficients by truncating decimal fractions down from a decimal point from the linear Hadamard transform coefficients added with said predetermined offset values; and a coding step of coding said lossless Hadamard transform coefficients acquired in said integral step, wherein values below a decimal point of said 16 linear Hadamard transform coefficients are one of 0, 0.25, 0.5 and 0.75, wherein in said offset step, no addition is made to a first group of transform coefficients, 0.25 is added to a second group of transform coefficients, 0.5 is added to a third group of transform coefficients, and 0.75 is added to a fourth group of transform coefficients as the offset values, wherein among the four groups, into which said 16 linear Hadamard transform coefficients are classified, three groups contain three or five transform coefficients, and wherein in a 4×4 offset matrix containing values four times the number of offset values corresponding to said 16 linear Hadamard transform coefficients, sums of the values in a row direction are odd in all rows or even in all rows, and sums of the values in a column direction are odd in all columns or even in all columns.

2. The data transform method according to claim 1, wherein said integral step comprises truncating decimal fractions down from a decimal point with a floor function.

3. The data transform method according to claim 1, wherein said coding step comprises entropy coding.

4. The data transform method according to claim 1, wherein said coding step comprises a DCT conversion step of performing DCT conversion using said lossless Hadamard transform coefficients.

5. The data transform method according to claim 4, wherein said coding step further comprises a JPEG coding step of performing JPEG coding using the DCT coefficients obtained in said DCT conversion step.

6. A computer-readable medium on which is stored a computer-executable program for implementing the data transform method according to claim 1 by controlling an information processing apparatus.

7. The data transform method according to claim 1, wherein said 4×4 offset matrix has been prepared by (1) making 4×4 bit plane matrices which satisfy all of three conditions effective from all 4×4 bit plane matrices in which each includes elements of 0 or 1, said three conditions including a first condition that sums of the elements in a row direction are odd in all rows or even in all rows, a second condition that sums of the elements in a column direction are odd in all columns or even in all columns, and a third condition that a total sum of the elements in each 4×4 bit plane matrix is 6 or 10, and (2) selecting combinations of two effective 4×4 bit plane matrices which satisfy a fourth condition from all combinations of 4×4 bit plane matrices that represent two bits indicating decimal fractions down from a decimal point of offset values in said offset matrix, said fourth condition being that a 4×4 bit plane matrix made by taking exclusive OR of the two effective 4×4 bit plane matrices satisfies all of said first, second and third conditions.

8. An information processing apparatus for acquiring lossless Hadamard transform coefficients for 16 pieces of input image data in 4×4 matrix form and generating a reduced amount of coded data based on the acquired lossless Hadamard transform coefficients, comprising:

linear transform means for acquiring 16 linear Hadamard transform coefficients by multiplying said 16 pieces of input image data by an Hadamard transform matrix;

offset means for classifying said 16 linear Hadamard transform coefficients into four groups, each group containing an odd number of coefficients, and adding predetermined offset values to the linear Hadamard transform coefficients in every group; and integral means for acquiring said lossless Hadamard transform coefficients by truncating decimal fractions down from a decimal point from the linear Hadamard transform coefficients added with said predetermined offset values; and coding means for coding said lossless Hadamard transform coefficients acquired by said integral means, wherein values below a decimal point of said 16 linear Hadamard transform coefficients are one of 0, 0.25, 0.5 and 0.75, wherein said offset means makes no addition to a first group of transform coefficients, adds 0.25 to a second group of transform coefficients, adds 0.5 to a third group of transform coefficients, and adds 0.75 to a fourth group of transform coefficients as the offset values, wherein among the four groups, into which said 16 linear Hadamard transform coefficients are classified, three groups contain three or five transform coefficients, and wherein in a 4×4 offset matrix containing values four times the number of offset values corresponding to said 16 linear Hadamard transform coefficients, sums of the values in a row direction are odd in all rows or even in all rows, and sums of the values in a column direction are odd in all columns or even in all columns.

9. The information processing apparatus according to claim 8, wherein said 4×4 offset matrix has been prepared by (1) making 4×4 bit plane matrices which satisfy all of three conditions effective from all 4×4 bit plane matrices in which each includes elements of 0 or 1, said three conditions including a first condition that sums of the elements in a row direction are odd in all rows or even in all rows, a second condition that sums of the elements in a column direction are odd in all columns or even in all columns, and a third condition that a total sum of the elements in each 4×4 bit plane matrix is 6 or 10, and (2) selecting combinations of two effective 4×4 bit plane matrices which satisfy a fourth condition from all combinations of 4×4 bit plane matrices that represent two bits indicating decimal fractions down from a decimal point of offset values in said offset matrix, said fourth condition being that a 4×4 bit plane matrix made by taking exclusive OR of the two effective 4×4 bit plane matrices satisfies all of said first, second and third conditions.

10. An information processing apparatus for outputting a reduced amount of coded data for 16 pieces of input image data in 4×4 matrix form, comprising:

linear transform means for acquiring 16 linear Hadamard transform coefficients by multiplying said 16 pieces of input image data by an Hadamard transform matrix;

offset means for classifying said 16 linear Hadamard transform coefficients into four groups, each group containing an odd number of coefficients, and adding predetermined offset values to the linear Hadamard transform coefficients in every group;

integral means for acquiring said lossless Hadamard transform coefficients by truncating decimal fractions down from a decimal point from the linear Hadamard transform coefficients added with said predetermined offset value; and coding means for performing entropy coding for said lossless Hadamard transform coefficients acquired by said integral means.

11. An information processing apparatus for outputting a reduced amount of coded data for 16 pieces of input image data, comprising:

linear transform means for acquiring 16 linear Hadamard transform coefficients by multiplying said 16 pieces of input image data by an Hadamard transform matrix;

offset means for classifying said 16 linear Hadamard transform coefficients into four kinds of groups, each group containing an odd number of coefficients, and adding predetermined offset values to the linear Hadamard transform coefficients in every group;

integral means for acquiring said lossless Hadamard transform coefficients by truncating decimal fractions down from a decimal point from the linear Hadamard transform coefficients added with said predetermined offset values;

lossless DCT conversion means for performing lossless DCT conversion using said lossless Hadamard transform coefficients acquired by said integral means; and entropy coding means for performing entropy coding using the lossless DCT coefficients obtained by said lossless DCT conversion means.

12. A data transform method for acquiring lossless Hadamard transform coefficients for 16 pieces of input image data in 4×4 matrix form and generating a reduced amount of coded data based on the acquired lossless Hadamard transform coefficients, comprising:

one or more computers implementing the following steps of:

a first parity step of acquiring the parity representing the odd-even property for the total sum of said 16 pieces of input image data;

a linear transform step of acquiring 16 linear Hadamard transform coefficients by multiplying said 16 pieces of input image data by an Hadamard transform matrix;

an offset step of classifying said 16 linear Hadamard transform coefficients into at least two groups, and adding predetermined offset values to the linear Hadamard transform coefficients in every group;

an integral step of acquiring said lossless Hadamard transform coefficients by truncating decimal fractions down from a decimal point from the linear Hadamard transform coefficients added with said predetermined offset values;

a second parity step of adding said parity to predetermined coefficients among said lossless Hadamard transform coefficients acquired in said integral step; and a coding step of coding said integral lossless Hadamard transform coefficients including the predetermined coefficients added with said parity, wherein values below a decimal point of said 16 linear Hadamard transform coefficients are one of 0, 0.25, 0.5 and 0.75, wherein in said offset step, no addition is made to a first group of transform coefficients, and 0.5 is added to a third group of transform coefficients as the offset values, wherein the two groups, into which said 16 linear Hadamard transform coefficients are classified, contain six or ten transform coefficients, and wherein in a 4×4 offset matrix containing values two times the number of offset values corresponding to said 16 linear Hadamard transform coefficients, sums of the values in a row direction are odd in all rows or even in all rows, and sums of the values in a column direction are odd in all columns or even in all columns.

13. The data transform method according to claim 12, wherein said first parity step comprising subtracting said parity from the data at predetermined position among said 16 pieces of input image data.

14. The data transform method according to claim 12, wherein said first parity step comprising adding said parity from the data at predetermined position among said 16 pieces of input image data.

* * * * *